United States Patent Office 3,427,318
Patented Feb. 11, 1969

3,427,318
CERTAIN 2-ALKANOYLAMINO-5-HALOTHIAZOLES
Michael Stuart Barber, South Benfleet, David Rex Broad, Romford, and Basil Jason Heywood, Hornchurch, England, assignors to May & Baker Limited, Dagenham, Essex, England, a British company
No Drawing. Filed Mar. 8, 1966, Ser. No. 532,557
Claims priority, application Great Britain, Mar. 10, 1965, 10,232/65; Dec. 3, 1965, 51,443/65
U.S. Cl. 260—306.8        9 Claims
Int. Cl. C07d 91/34; A01n 9/14

ABSTRACT OF THE DISCLOSURE

The invention provides novel 2-alkanoylamido-5-halothiazoles which are useful as post-emergence herbicides.

---

This invention relates to thiazole derivatives which are of use as herbicides.

As a result of research and experimentation, it has been discovered that certain new thiazole derivatives have valuable herbicidal properties. These thiazole derivatives are compounds of the general formula:

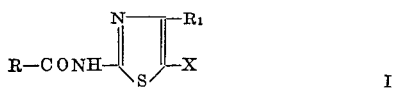

(wherein R represents a straight- or branched-chain aliphatic hydrocarbon, preferably alkyl, group containing from 2 to 5 carbon atoms, $R_1$ represents a hydrogen or halogen atom, or a straight- or branched-chain aliphatic hydrocarbon, preferably alkyl, group containing from 1 to 3 carbon atoms, or a straight- or branched-chain aliphatic hydrocarbon, preferably alkyl, group containing from 1 to 3 carbon atoms substituted by one or more halogen atoms, for example a trifluoromethyl group, and X represents a chlorine, bromine or iodine atom) and salts thereof.

According to a feature of the present invention, the thiazole derivatives of general Formula I, and salts thereof, are used to control the growth of weeds, i.e. undesired vegetation. For this purpose, they are normally used in the form of herbicidal compositions, i.e. in association with compatible diluents or carriers suitable for use in herbicidal compositions, for example as hereinafter described.

The thiazole derivatives of general Formula I, and salts thereof, possess herbicidal activity against dicotyledonous, i.e. broad-leafed, and monocotyledonous, e.g. grass, weeds, on post-emergene application. By the term "post-emergence application" is meant application to the aerial or exposed parts of the emerged weeds or to the soil in which they are growing. For example, the thiazole derivatives, and salts thereof, may be used to control the growth of weeds such as Chenopodium spp., Polygonum spp. including *Polygonum lapathifolium* and *Polygonum aviculare, Raphanus raphanistrum, Sinapis arvensis, Gallium aparine, Stellaria media, Alopecurus pratensis, Agrostis stolonifera,* Avena fatua and *Poa annua* by post-emergence application. The amounts of thiazole derivative or derivatives applied vary with the nature of the weeds, the compositions used, the mode and time of application, and, when used to control the growth of weeds in crop-growing areas, the nature of the crops. In general, taking these factors into account, application rates of from 1 to 4 lbs. per acre give good results, particularly with preferred compounds as hereinafter described. It must, however, be understood that higher or lower application rates may be used, depending upon the particular problem of weed control encountered.

The thiazole derivatives, and salts thereof, may be used to control the growth of weeds in crop-growing areas by post-emergence application, and for this purpose are normally applied prior to the planting or sowing of the crop, or, in the case of crops whose seeds are deeply sown and/or which remain dormant for a period sufficiently long to allow the more rapidly developing weeds to be controlled without substantial damage to the crop, prior to the emergence of the crop.

The thiazole derivatives, and salts thereof, may also be used to control, normally in association with compatible diluents or carriers, the growth of undesired vegetation in orchards and plantations by directional application or application during the dormant stage of the crop, and to control the growth of undesired vegetation in fallow or uncultivated land. When used for these purposes, in which a total herbicidal effect is frequently desired, the active compounds are normally applied at dosage rates higher than those used of crop-growing areas. The precise dosage will depend upon the nature of the vegetation treated and the effect sought.

According to a further feature of the present invention, the thiazole derivatives of general Formula I are used to exercise a desiccant or defoliant effect upon crops such as potatoes, hops, cotton and leguminous seed-crops.

When used for the control of undesired vegetation, or as crop desccants or defoliants, the thiazole derivatives, and salts thereof, may, if desired, be used in association with other herbicidally active compounds.

This invention includes also herbicidal compositions containing one or more thiazole derivatives of general Formula I, or salts thereof, in association with, and preferably homogeneously dispersed in, one or more compatible herbicidally-acceptable diluents or carriers. By the term "compatible herbicidally-acceptable diluents or carriers" is meant diluents or carriers of the type generally accepted in the art as being suitable for use in herbicidal compositions and which are compatible with the thiazole derivatives of general Formula I and salts thereof. The term "homogeneously dispersed" is used to include compositions in which the thiazole derivatives, or salts thereof, are dissolved in the other components. The term "herbicidal compositions" is used in a broad sense to include not only compositons which are ready for use as herbicides but also concentrates which must be diluted before use. Preferably, the compositions contain from 0.05 to 90% by weight of the thiazole derivatives, or salts thereof.

The herbicidal compositions may contain both a diluent or carrier and a surface-active, e.g. wetting, dispersing or emulsifying, agent. Surface-active agents which may be present in the herbicidal compositions of the present invention may be of the ionic or non-ionic types, for example, sulphoricinoleates, quaternary ammonium derivatives, products based on condensates of ethylene oxide, such as condensates of ethylene oxide with nonyl or octyl phenols, or fatty acid esters of anhydrosorbitols which have been rendered soluble by etherification of the free hydroxy groups by condensation with ethylene oxide, alkali and alkaline earth metal salts of sulphuric acid esters and sulphonic acids such as sodium di-nonyl and di-octyl-sulphosuccinates and alkali and alkaline earth metal salts of high molecular weight sulphonic acid derivatives such as sodium and calcium lignosulphonates. Examples of suitable solid diluents or carries are aluminium silicate, talc, calcined magnesia, kieselguhr, tricalcium phosphate, powdered cork, absorbent carbon black and clays such as kaolin and bentonite. The solid compositions, which may take the form of dusts, granules or wettable powders, are preferably prepared by grinding the thiazole derivatives of general Formula I, or salts thereof, with the solid diluents or carriers or by impregnating the solid diluents or carriers with solutions of the thiazoles in volatile solvents, evaporating the solvents and, if necessary, grinding the products so as to obtain powders. Granular formulations may be prepared by absorbing the thiazole derivatives dissolved in volatile solvents onto the solid diluents or carriers in granular form and evaporating the solvents, or by granulating compositions in powder form obtained as described above. Solid herbicidal compositions, particularly wettable powders, may contain wetting or dispersing agents, for example of the type described above, which may also, when solid, serve as diluent or carrier.

Liquid compositions according to the invention may take the form of aqueous, organic or aqueous-organic solutions, suspensions and emulsions which may incorporate a surface-active, e.g. wetting, dispersing, or emulsifying, agent. Suitable liquid diluents for incorporation in the liquid compositions include water, acetophenone, cyclohexanone, isophorone, toluene, xylene and mineral, animal and vegetable oils (and mixtures of these diluents).

Surface-active agents which may be present in the liquid compositions may be ionic or non-ionic, for example of the types described above, and may, when liquid, also serve as diluents or carriers. Thus, liquid diluents or carriers may be, for example, liquids which are other than animal, vegetable and mineral oils and which contain surface-active agents and animal, vegetable and mineral oils which may contain surface-active agents. When desired, emulsions of the thiazole derivatives may be used in the form of self-emulsifying concentrates containing the active substances dissolved in the emulsifying agents or in solvents containing emsulfying agents compatible with the active substances, the simple addition of water to such concentrates producing compositions ready for use.

Herbicidal compositions according to the present invention may also contain, if desired, conventional adjuvants such as, for example, adhesives, colouring agents and corrosion inhibitors. These adjuvants may also serve as carriers or diluents.

Herbicidal compositions according to the present invention may also comprise the thiazole derivatives of general Formula I, and salts thereof, in association with, and preferably homogeneously dispersed in, one or more other herbicidally active compounds, and, if desired, one or more compatable herbicidally-acceptable diluents or carries, surface active agents and conventional adjuvants as hereinbefore described.

Examples of other herbicidally active compounds which may be included in, or used in conjunction with, the herbicidal compositions of the present invention include phenoxyalkanoic acids, e.g. γ-(4-chloro-2-methylphenoxy)-butyric acid, γ-(2,4-dichlorophenoxy)butyric acid, 4-chloro-2-methylphenoxyacetic acid, 2,4-dichlorophenoxyacetic acid, α-(4-chloro-2-methylphenoxy)-propionic acid and α-(2,4-dichlorophenoxy)-propionic acid, benzoic acid derivatives, e.g. 2,3,6-trichlorobenzoic acid, 2-methoxy-3,6-dichlorobenzoic acid and 3-amino-2,5-dichlorobenzoic acid, halogenated aliphatic acids, e.g. trichloroacetic acid and α,α-dichloropropionic acid, carbamates, e.g. isopropyl N-(3-chlorophenyl)-carbamate, isoproyl N-phenylcarbamate, and 3-chlorobut-2-ynyl N-(3-chlorophenyl)carbamate, amides, e.g. 3,4-dichloropropionanilide, urea derivatives, e.g. N'-(4-chlorophenyl)-N,N-dimethylurea and N,N-dimethyl-N'-phenylurea, diazines, e.g. 5-bromo-3-isopropyl-6-methyluracil, triazines, e.g. 2-chloro-4,4-bis-ethylamino-1,3,5-triazine, substituted phenols, e.g. 2-methyl-4,6-dinitrophenol, quaternary ammonium derivatives, e.g. 1,1'-ethylene-2,2'-bipyridylium and 1,1'-dimethyl-4,4'-bipyridylium salts, benzonitrile derivatives, e.g. 2,6-dichlorobenzonitrile and 3,5-diiodo- and 3,5-dibromo-4-hydroxybenzonitriles and their esters, thiazole derivatives, e.g. 3-amino-1,2,4-triazole, and benzenesulphonyl carbamates, e.g. methyl 4-aminobenzenesulphonylcarbamate.

Preferred compounds according to the present invention are the thiazole derivatives of Formula I wherein R represents an alkyl group and $R_1$ represents a hydrogen or halogen atom or an unsubstituted alkyl group, and their salts.

Compounds of particular value are those wherein R represents an ethyl group, $R_1$ represents a hydrogen atom or a methyl group, and X represents a chlorine, bromine, or iodine atom, i.e. 5-chloro-4-methyl-2-propionamidothiazole, 5-bromo-4-methyl-2-propionamidothiazole, and more especially, 5-chloro-2-propionamidothiazole, 5-bromo-2-propionamidothiazole, 5-iodo-2-propionamidothiazole and 5-iodo-4-methyl-2-propionamidothiazole. The aforementioned compounds, herbicidal compositions containing them, and their use as herbicides, form preferred features of the present invention.

Siutable salts of the thiazole derivatives of Formula I which can be used according to the present invention are salts of the kind usually used in herbicidal preparations and, more particularly, alkali metal salts, for example sodium or potassium, salts.

The following example illustrates the herbicidal compositions of the present invention:

Example I

A wettable powder is formed from the following:

|   | G. |
|---|---|
| 5-iodo-2-propionamidothiazole | 25 |
| Texofor F60 (an ethylene oxide/octylphenol condensate) | 10 |
| Celtite X205 (finely divided aluminium silicate) | 65 | by dissolving the thiazole derivative in acetone (ca 1 litre), spraying this solution onto a mixture of the other ingredients in a ribbon-blender and grinding the resultant powder to a suitable fineness. This powder is suspended in water and applied at rates of from 1 to 4 lbs. of thiazole derivative in 30 gallons of water per acre to control *Chenopodium album, Polygonum lapithifolium, Raphanus raphanistrum, Sinapis arvensis, Stellaria media, Alopecurus pratensis, Avena fatua* and *Poa annua* by post-emergence application.

Similar wettable powders may be prepared by replacing the 5-iodo-2-propionamidothiazole by a similar quantity of another thiazole derivative of general Formula I or salts thereof, more particularly 5-bromo-2-propionamidothiazole, 5-chloro-3-propionamidothiazole, 5-chloro-4-methyl-2-propionamidothiazole, 5-bromo-4-methyl-2-propionamidothiazole, or 5-iodo-4-methyl-2-propionamidothiazole.

According to a feature of the present invention, the new thiazole derivatives of general Formula I and salts thereof are prepared by known methods for the preparation of 2-acylamino-5-halogenothiazoles. By the term "known methods" as used in the present specification is meant methods heretofore used or described in the liteurature. Suitable methods are, for example, as described by E. Pedley, J. Chem. Soc. 1947, 431, Chem. Abs. 41, 5510a for the preparation of 2-acetamido-5-chlorothiazole, by G. Travagli, Gazz, Chim. Ital., 78, 592–9 (1948), Chem. Abs., 43, 2616, for the preparation of 2-acetamido-5-iodothiazole and by C. D. Hurd and H. L. Wehrmeister, J. Amer. Chem. Soc., 71, 4407 (1949), for the preparation of 2-acetamido-5-bromo- and 5-iodothiazoles. particular processes by which the thiazole derivatives of general Formula I, and salts thereof, may be prepared are:

(a) By the halogenation of a 2-acylaminothiazole compound of the general formula:

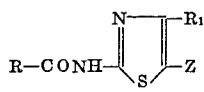
II wherein R and $R_1$ are as hereinbefore defined and Z represents a hydrogen atom or a group —HgCl or —HgO·CO·CH$_3$.

Suitable methods of halogenation include:

(i) When Z represents a hydrogen atom, (a) by chlorination with sulphuryl chloride in a suitable inert organic solvent such as, for example, carbon disulphide, reaction being preferably carried out at the refluxing temperature of the reaction mixture or with molecular chlorine in a suitable inert medium, for example, water or an inert organic solvent such as, for example, carbon disulphide or a chlorinated hydrocarbon, e.g. chloroform, carbon tetrachloride or methylene chloride, reaction being preferably carried out at laboratory temperature, (b) by bromination with molecular bromine in a suitable inert organic solvent such as, for example, carbon disulphide, or a chlorinated hydrocarbon, e.g. chloroform, carbon tetrachloride or methylene chloride, reaction being preferably carried out at laboratory temperature or at the boiling temperature of the solvent, and (c) by iodination with a mixture of sodium or potassium iodide and sodium or potassium iodate in acidic aqueous or aqueous-organic, e.g. aqueous ethanol, media, reaction being preferably carried out with gentle heating, or with molecular iodine in an inert organic solvent such as, for example, a chlorinated hydrocarbon, e.g. chloroform, or a lower alkanol, e.g. ethanol.

(ii) When Z represents a group —HgCl or

—Hg·O·CO·CH$_3$ (a) by chlorination with molecular chlorine in an inert medium such as, for example, water, reaction being preferably carried out at laboratory temperature, (b) by bromination with molecular bromine and an alkali metal bromide such as, for example, sodium bromide, in an inert organic medium such as, for example, methanol, reaction being preferably carried out at laboratory temperature, or (c) by iodination with molecular iodine and an alkali metal iodide such as, for example, potassium iodide, in an inert medium such as, for example, water, reaction being preferably carried out at laboratory temperature or with heating to a temperature up to approximately 100° C.

The compounds of general Formula II wherein Z represents a hydrogen atom may be prepared according to known methods for the preparation of 2-acylaminothiazoles, for example as described by E. Pedley (loc. cit.) for the preparation of 2-acetamidothiazole, and by Ueda, Ueda and Toyoshima, Yakugaku Zasshi, 1959, 19, 920— Chem. Abs. 55, 21888c, for the preparation of 2-propionamidothiazole, by reaction of a 2-aminothiazole derivative of the general formula:

III (wherein $R_1$ is as hereinbefore defined) with an acid or functional derivative thereof such as an anhydride, acid halide, ester or thioester collectively represented by the general formula:

R·CO·Y    IV wherein Y represents a halogen atom or a hydroxy, alkoxy or alkylthio group or a group R·CO·O— and R is as hereinbefore defined. The reaction may be effected in the presence or absence of an inert organic solvent, such as, for example, benzene, toluene or xylene and in the presence or absence of an acid-binding agent such as an alkali metal carbonate, bicarbonate or hydroxide or a tertiary base such as triethylamine, pyridine or quinoline.

Compounds of general Formula II wherein Z represents a group —HgCl or —HF·O·CO·CH$_3$ may be prepared from the corresponding compounds of general Formula II wherein Z represents a hydrogen atom by treatment with mercuric chloride in water or with mercuric acetate acid, if required with heating to a temperature of approximately 100° C.

(b) By the acylation of a 2-amino-5-halogenothiazole of the general formula:

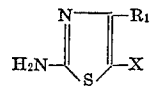
V wherein $R_1$ and X are as hereinbefore defined, by treatment with a compound of general Formula IV, reaction being effected as hereinbefore described for the preparation of the compounds of general Formula II.

The 2-amino-5-halogenothiazoles of general Formula V may be prepared from the corresponding 2-acetamido-5-halogenothiazoles by hydrolysis with dilute aqueous acid, for example as described by E. Pedley, loc. cit., for the preparation of 2-amino-5-chlorothiazole from 2-acetamido-5-chlorothiazole.

According to a further feature of the present invention, compounds of general Formula I wherein $R_1$ and X both represent the same halogen atom are prepared by the halogenation of a compound of the formula:

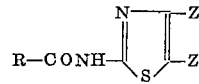
VI wherein R and Z are as hereinbefore defined.

Suitable methods of halogenation include (a) chlorination with molecular chlorine in an inert medium such as, for example, water, reaction being preferably carried out at laboratory temperature, (b) bromination with molecular bromine and an alkali metal bromide such as, for example, sodium bromide, in an inert organic medium such as, for example, methanol, reaction being preferably carried out at laboratory temperature, or with heating to a temperature up to approximately 90° C., or (c) iodination with molecular iodine and an alkali metal iodide such as, for example, potassium iodide, in an inert medium such as, for example, water, reaction being preferably carried out at laboratory temperature or with heating to a temperature up to approximately 90° C.

Compounds of general Formula VI in which Z represents a group—HgCl or —HgOCO·CH$_3$ may be prepared from the corresponding compounds of general Formula II, wherein $R_1$ and Z both represent hydrogen atoms by treatment with an excess of mercuric chloride in water, or an excess of mercuric acetate in acetic acid, preferably with heating to a temperature of approximately 100° C.

The thiazole derivatives of general Formula I may be converted into salts by known methods for the preparation of salts of amides, for example into their alkali metal salts by reacting the thiazole derivative with a stoichiometric quantity of the alkali metal or a suitable derivative thereof, such as an alkoxide or hydroxide, in a suitable solvent such as, for example, an alcohol, e.g. methanol or ethanol, or water.

The use, as solvent media in the preparation of salts of the thiazole derivatives of Formula I, of water and other solvents suitable for use in herbicidal compositions is particularly convenient as concentrates can be directly prepared ready for dilution for use as herbicides without the need to isolate the salt.

The following examples illustrate the preparation of compounds of the present invention:

Example II 2-amino-4-methyl-5-chlorothiazole (14,85 g.) and propionic anhydride (25 ml.) were heated together with concentrated sulphuric acid (0.2 ml.) for one hour on a steam bath, cooled in ice, and filtered. The solid was washed with a mixture of acetic acid (10 ml.) and water (30 ml.) and recrystallised twice from 1:1 aqueous ethanol (40 ml.) to give 5-chloro-4-methyl-2-propionamidothiazole (1.5 g.), M.P. 157–159° C.

Found: S, 15.6%. $C_7H_9ClN_2OS$ required S, 15.7%.

The 2-amino-4-methyl-5-chlorothiazole used as starting material was prepared according to J.P. English et al. J. Am. Chem. Soc. 68, 453–8 (1946).

Example III 4-methyl-2-propionamidothiazole (4.25 g.) was dissolved in dry chloroform (50 ml.) and cooled to +5° C. A solution of bromine (4.0 g.) in dry chloroform (10 ml.) was added dropwise at +5° C. over ½ hour.

The mixture was then refluxed for 1 hour, cooled, and the chloroform evaporated in vacuo keeping the temperature below 50° C.

Three recrystallisations of the residue from aqueous methanol (1:1, 100 ml.) yielded 5-bromo-4-methyl-2-propionamidothiazole (6.05 g.), M.P. 166°–168° C.

Found: N, 11.1%. $C_7H_9BrN_2OS$ requires N, 11.25%.

The 4-methyl-2-propionamidothiazole used as starting material was prepared as follows:

2-amino-4-methylthiazole (prepared as described in Organic Syntheses, II, 31) (22.8 g.) was dissolved in a mixture of pyridine (20 ml.) and dry acetone (150 ml.). The solution was cooled to +5° C. in an ice bath and treated dropwise over a period of 45 minutes with propionyl chloride (18.51 g.).

The mixture was then refluxed for 1 hour, cooled, and the acetone evaporated in vacuo, keeping the temperature below 40° C. The residue was triturated with water (100 ml.), filtered and twice recrystallised from aqueous methanol (1:1, 200 ml.) to yield 4-methyl-2-propionamidothiazole (17.12 g.), M.P. 108° C.–109° C. Found: C, 49.2%; H, 6.1%; N, 16.1%. $C_7H_{10}N_2OS$ requires C, 49.4%; H, 5.9%; N, 16.5%; S, 18.8%.

Example IV 4-methyl-2-propionamidothiazole (prepared as in Example III, 5.10 g.) was dissolved in 300 ml. of boiling water, and treated with mercuric acetate (9.5 g.).

The slurry was heated at 100° C. for a further 30 minutes, excess sodium chloride (100 g.) in water (100 ml.) added, and the mixture stirred for 15 minutes then filtered. The precipitate was washed with water followed by acetone, and dried at 40° C. for 24 hours, to yield 5-chloromercuri-4-methyl-2-propionamidothiazone (11.71 g.), M.P. >300° C.

This chloromercuri derivative (11.71 g.) was suspended in a mixture of iodine (6.6 g.) and potassium iodide (7.0 g.) in water (150 ml.) heated gently on a steam bath for 30 minutes, cooled in ice and filtered. The precipitate was washed with saturated $Na_2S_2O_3$ solution (5 ml.) and recrystalised twice from aqueous methanol (1:1, 150 ml.) to yield 5-iodo-4-methyl-2-propionamidothiazole, (5.21 g.), M.P. 170–172° C.

Found: I, 43.1%. $C_7H_9IN_2OS$ requires I, 42.90%.

Example V

Redistilled sulphuryl chloride (18.7 ml.) was added slowly to a refluxing solution of 2-propionamidothiazole (30.0 g.) in carbon disulphide (300 ml.). After the addition was complete, the mixture was heated under reflux for a further half an hour, cooled to −20° C., filtered and the residue recrystallised from ethanol, to give 5-chloro-2-propionamidothiazole (21.0 g.), M.P. 178°–180° C.

Example VI

A solution of bromine (2 ml.) in carbon disulphide (10 ml.) was added dropwise at laboratory temperature to a solution of 2-propionamidothiazole (5 g.) in carbon disulphide (50 ml.). After the addition was complete, the mixture was heated gently under reflux for half an hour. The carbon disulphide was then evaporated and the solid residue washed with a small quantity of dilute aqueous solution of sodium thiosulphate and recrystallised twice from ethanol to give 5-bromo-2-propionamidothiazole (5 g.), M.P. 175°–177° C.

Example VII

A mixture of 2-propionamidothiazole (15.6 g.) and mercuric acetate (20 g.) in glacial acetic acid (50 ml.) was heated at 100° C. for two hours, cooled to laboratory temperature and filtered. The solid residue was washed, successively with acetic acid, methanol, water and acetone, to give 5-acetoxymercuri-2-propionamidothiazole (34.5 g.), M.P. >300° C. A mixture of 5-acetoxymercuri-2-propionamidothiazole (6.3 g.), iodine (3.4 g.) and potassium iodide (7 g.) in water (125 ml.) was heated at 80° C. with stirring, for one and a half hours, cooled to laboratory temperature, filtered and the precipitate extracted with ethanol (100 ml.). The ethanol solution was then diluted with a large excess of water (approximately 1 litre), filtered and the solid residue dried at 40° C., to give 5-iodo-2-propionamidothiazole (3.6 g.), M.P. 196°–199° C.

Example VIII 2-amino-5-chlorothiazole (5 g.) was mixed with propionic anhydride (8 ml.) and allowed to stand for half an hour at laboratory temperature. The precipitated solid was then filtered off and recrystallised from ethanol to give 5-chloro-2-propionamidothiazole (2 g.), identical to the product of Example V.

Example IX

Proceeding as in Example VIII, but commencing with 2-amino-5-chlorothiazole (10 g.) and n-butyric anhydride (20 ml.) 2-n-butyramido-5-chlorothiazole (7.0 g.), M.P. 162°–163° C., was obtained.

Example X

Proceeding as in Example VIII but commencing with 2-amino-5-chlorothiazole (10 g.) and iso-butyric anhydride (20 ml.), 2-iso-butyramido-5-chlorothiazole (2.4 g.), M.P. 164°–165° C., was obtained.

Example XI n-Valeryl chloride (6 g.) was added dropwise over half an hour to a solution of 2-amino-5-chlorothiazole (6.8 g.) in dry acetone (100 ml.) and dry pyridine (4 ml.), the temperature being maintained at 4° C. The reaction mixture was then refluxed for half an hour and the acetone then removed under reduced pressure at a temperature not greater than 40° C. The solid residue was triturated with water (100 ml.) and recrystallised from ethanol (170 ml.) to give 5-chloro-2-n-valeramidothiazole (4.7 g.), M.P. 157°–159° C.

Example XII

Proceeding as in Example XI, but commencing with 2-amino-5-chlorothiazole (6.8 g.) and (DL)-methylethylacetyl chloride (6.0 g.), 5-chloro-2-(methylethylacetamido)thiazole (3.84 g.), M.P. 105–106° C., was obtained.

Example XIII

Pivaloyl chloride (13 ml.) was added dropwise over half an hour to a solution of 2-amino-5-chlorothiazole (13.45 g.) in dry benzene (50 ml.) and triethylamine (14.4 ml.), the temperature being maintained below 35° C. The reaction mixture was then stirred overnight at laboratory temperature and filtered. The solid residue was washed with benzene (50 ml.) and the combined filtrate and washings evaporated to dryness, giving a solid residue which was recrystallised from ethanol to give 5-chloro-2-trimethylacetamidothiazole (31 g.), M.P. 124°–125.5° C.

Example XIV

Proceeding as in Example XIII, but commencing with 2-amino-5-chlorothiazole (6.5 g.), triethylamine (7 ml.) and hexanoyl chloride (6.5 g.), 5-chloro-2-hexanamidothiazole (0.6 g.), M.P. 132°–133° C., was obtained.

Example XV

Proceeding as in Example XIII, but commencing with 2-amino-5-chlorothiazole (4.5 g.), triethylamine (5 ml.) and 1-methylvaleryl chloride (5 g.), 5-chloro-2-(1-methylvaleramido)thiazole (0.7 g.), M.P. 77°–78° C., was obtained.

Example XVI

A suspension of 2-propionamidothiazole (12.48 g.) in ethanol (50 ml.) and a solution of potassium iodide (11.12 g.) and potassium iodate (7.58 g.) in water (100 ml.) were added simultaneously, dropwise, over half an hour to a mixture of ethanol (20 ml.), concentrated sulphuric acid (3.4 ml.) and water (80 ml.), the temperature being maintained at 48°–50° C. during the addition. The reaction mixture was then stirred at 50° C. ±2° C. for a further two hours, cooled to 0° C., decolourised by the addition of saturated aqueous sodium metabisulphite solution (ca. 4 ml.), and filtered. The solid residue was washed with ice-water (100 ml.) and recrystallised from a mixture of ethanol (200 ml.) and water (100 ml.), to give 5-iodo-2-propionamidothiazole (9.45 g.), identical to the product of Example VII.

Example XVII

A solution of 2-isobutyramidothiazole (6.8 g.) in ethanol (25 ml.), and a solution of potassium iodide (6.8 g.) and potassium iodate (3.8 g.) in water (50 ml.) were added simultaneously over a period of 30 minutes to a mixture of concentrated sulphuric acid (1.7 ml.), ethanol (10 ml.) and water (40 ml.), the temperature being maintained at 48–50° C. throughout the addition. On complete addition the mixture was stirred for one hour at 50° C. and then cooled to 0° C. in an ice bath. Sodium metabisulphite (1.0 g.) was added to decolourise the mixture and a solid precipitate removed by filtration. The solid was washed with water (30 ml.) and recrystallised from a mixture of ethanol (10 ml.), and water (3 ml.) to give 2-isobutyramido-5-iodothiazole (0.5 g.), M.P. 188–190° C.

The 2-isobutyramidothiazole used as starting material was prepared according to the method of Ueda, Ueda and Toyoshima, Yakugaku Zasshi, 1959, 79, 920—Chem. Abs. 55, 21888c, for the preparation of 2-propionamidothiazole but replacing the propionic anhydride by isobutyric anhydride.

Example XVIII 4,5-diacetoxymercuri-2-propionamidothiazole (15.0 g.) was added to a solution of iodine (14.5 g.) and potassium iodide (35 g.) in water (125 ml.), and the mixture heated for 2 hours at 90° C., then cooled to room temperature, filtered, and the residue sequentially washed with saturated aqueous potassium iodide solution (20 ml.), water (50 ml.), and saturated aqueous sodium thiosulphate solution (5. ml.). It was then dissolved in hot methanol (200 ml.), treated with charcoal and filtered. The filtrate was diluted with water (200 ml.) and cooled to give a precipitate of 4,5-diiodo-2-propionamidothiazole (5.62 g.), M.P. 191–194° C.

The 4,5-diacetoxymercuri-2-propionamidothiazole used as starting material was prepared as follows:

2-propionamidothiazole (prepared as described by Ueda et al., Chem. Abs. 53 2188f) (15.6 g.), mercuric acetate (80 g.) and glacial acetic acid (340 ml.) were stirred vigorously and heated at 100° C. for 18 hours. The mixture was then cooled, filtered and the residue washed sequentially with glacial acetic acid (50 ml.), water (100 ml.), and acetone (500 ml.) to yield 4,5-diacetoxymercuri-2-propionamidothiazole (45 g.), M.P.> 360° C.

Example XIX

Proceeding as in Example XVIII, but using bromine (10 ml.) in methanol (220 ml.) saturated with potassium bromide, there was obtained 4,5-dibromo-2-propionamidothiazole (1.93 g.), M.P. 159–162° C.

We claim:
1. Thiazole derivatives of the formula:

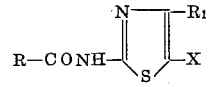

wherein R represents ethyl or isopropyl, $R_1$ represents a hydrogen atom, an alkyl group of 1 through 3 carbon atoms, or an alkyl group of 1 through 3 carbon atoms substituted by one or more halogen atoms, and X represents a chlorine, bromine or iodine atom, and salts thereof.

2. Thiazole compounds according to claim 1 wherein R represents an ethyl group and $R_1$ represents a hydrogen atom or a methyl group.

3. The thiazole derivative according to claim 1 wherein R is ethyl, $R_1$ is hydrogen and X is chlorine.

4. The thiazole derivative according to claim 1 wherein R is ethyl, $R_1$ is hydrogen and X is bromine.

5. The thiazole derivative according to claim 1 wherein R is ethyl, $R_1$ is hydrogen and X is iodine.

6. The thiazole derivative according to claim 1 wherein R is ethyl, $R_1$ is methyl and X is chlorine.

7. The thiazole derivative according to claim 1 wherein R is ethyl, $R_1$ is methyl and X is bromine.

8. The thiazole derivative according to claim 1 wherein R is ethyl, $R_1$ is methyl and X is iodine.

9. A salt of a thiazole derivative according to claim 1 which is an alkali metal salt.

References Cited

Garreau, Bull. Soc. Chim. France, vol. 21, pp. 1048–1059 (1954).

ALTON D. ROLLINS, *Primary Examiner.*

U.S. Cl. X.R.

71—82; 260—299